(12) United States Patent
Ali

(10) Patent No.: US 8,773,079 B2
(45) Date of Patent: Jul. 8, 2014

(54) METHOD OF AND PLANT FOR STORAGE AND RETRIEVAL OF ELECTRICAL ENERGY

(76) Inventor: Muhammad Amzad Ali, San Ramon, CA (US)

( * ) Notice: Subject to any disclaimer, the term of this patent is extended or adjusted under 35 U.S.C. 154(b) by 783 days.

(21) Appl. No.: 12/925,528

(22) Filed: Oct. 25, 2010

(65) Prior Publication Data

US 2012/0098274 A1    Apr. 26, 2012

(51) Int. Cl.
*H02J 7/16* (2006.01)
*H05K 1/02* (2006.01)

(52) U.S. Cl.
USPC .............................. 320/166; 320/167; 307/42

(58) Field of Classification Search
USPC ......... 320/166, 167, 134, 132, 137, 101, 104, 320/116, 118, 119, 123, 127; 290/1 R, 2, 3
See application file for complete search history.

(56) References Cited

U.S. PATENT DOCUMENTS

| | | | |
|---|---|---|---|
| 6,026,349 A * | 2/2000 | Heneman | 702/60 |
| 6,204,568 B1 * | 3/2001 | Runner | 290/1 R |
| 8,334,603 B2 * | 12/2012 | Daya | 290/1 R |
| 2005/0173925 A1 * | 8/2005 | Farkas | 290/1 A |
| 2006/0119102 A1 * | 6/2006 | Hershey et al. | 290/1 R |
| 2008/0212262 A1 * | 9/2008 | Micallef | 361/502 |
| 2009/0032350 A1 * | 2/2009 | Shapery | 191/10 |
| 2009/0315518 A1 * | 12/2009 | Soma et al. | 320/134 |
| 2011/0084500 A1 * | 4/2011 | Kennedy | 290/1 R |
| 2012/0217805 A1 * | 8/2012 | De Chabris | 307/44 |

* cited by examiner

*Primary Examiner* — Drew A Dunn
*Assistant Examiner* — Alexis Boateng

(57) ABSTRACT

A series of capacitors arranged in a way to prevent build up of electric flux between the plates of adjacent capacitors. The capacitors are electrically wired and provided with means to charge them by deriving electrical energy from a power source. The capacitors are also provided with means to discharge them one at a time at predetermined interval and during discharging, momentarily activate a motor. As the motor is activated during the discharge event of a capacitor it rotates a shaft which has means to engage and rotate a second shaft mounted with a flywheel. The first shaft will have means to disengage itself from the second shaft in between the discharge events of any two capacitors. The second shaft is connected to a third shaft through a gear box allowing it to rotate at desired rpm. The third shaft is also connected to a generator to produce electricity. Before the start of the process of discharging the capacitors the second shaft starts rotating with the help of a starter and a starter gear to overcome the inertia of rest of the flywheel.

18 Claims, 3 Drawing Sheets

METHOD OF AND PLANT FOR STORAGE AND RETRIEVAL OF ELECTRICAL ENERGY

This invention relates to storage and retrieval of electrical energy. There are many different means to produce electricity; however, storing electricity in large quantity for future use is a problem. At present battery technology is widely used to store electricity for household and other uses. This technology has limitations. Batteries can be recharged for a limited number of cycles, after which they need to be discarded. Moreover, storing a huge amount of electricity will need too many and too large batteries which will make it prohibitive in cost.

Capacitors are devices which are used to store electrical energy. After discharge a capacitor can be recharged for virtually unlimited number of cycles; however the biggest drawback of a capacitor is that when it is discharged the entire electrical energy stored in it comes out in a few milliseconds. That is why capacitors have only limited use in electronics. They cannot be used to store electricity and retrieve it later at a steady rate for normal household and industrial use.

Because of global warming there is an urgency of producing electricity through solar power, wind power, hydro power etc. Energy from these sources are not only clean, they are renewable also. Producing electricity through these means and using a smart grid to satisfy the electricity demand of a vast region will necessitate storage and retrieval of electricity in efficient, safe, and cost effective manner.

Therefore, it is an object of this invention to provide a method of and plant for storing electrical energy for future use.

It is a further object of this invention to provide a method of and plant for retrieving stored electrical energy and produce electricity at a predetermined steady rate.

Other and more specific objects will appear in the following detailed description of the invention and as illustrated in the accompanying drawings wherein:

FIG. 1 is a schematic diagram showing the top view of an assembly of capacitors and the necessary wirings and other installations to charge and discharge the said capacitors. This view is taken along section 2-2 of FIG. 2. It is to be noted that this view is a part view of the entire assembly of capacitors and other associated installations meaning that the whole assembly can be made as big as desired.

Figure 1:
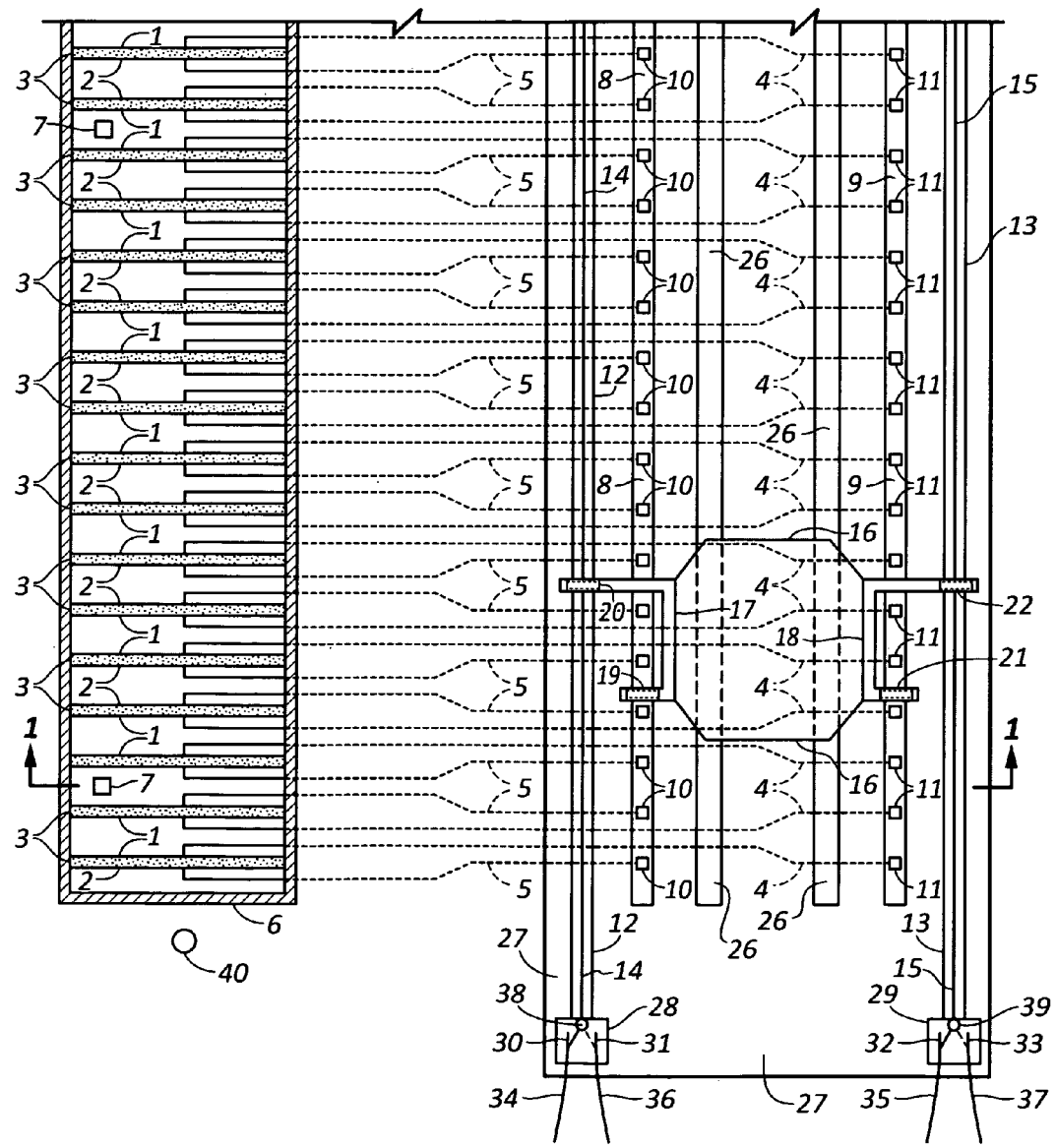

In all the figures like reference numbers designate corresponding parts. Towards the left side of FIG. 1 and FIG. 2 capacitor housing 6 is shown where a series of capacitors are placed one after another. In the capacitor housing all the capacitors are to be supported in such a way so that they are prevented from moving in any direction. The whole housing and the support system are to be built by materials which are non conductors of electricity. The capacitor housing has sump 7 at several locations on its floor to collect any water that may seep into the housing. These sumps will be equipped with sump pumps and sensors to raise alarm.

Each capacitor is composed of plates 1 and 2 with the dielectric 3 placed in between the two plates. In this embodiment plate 1 is considered negatively charged and plate 2 is considered positively charged. The capacitors are placed in the capacitor housing in such a way so that the positive plate of one capacitor faces the positive plate of the next capacitor. Similarly the negative plate of one capacitor will face the negative plate of the next capacitor. This arrangement will eliminate build up of electric flux between any two capacitors.

Figure 2:
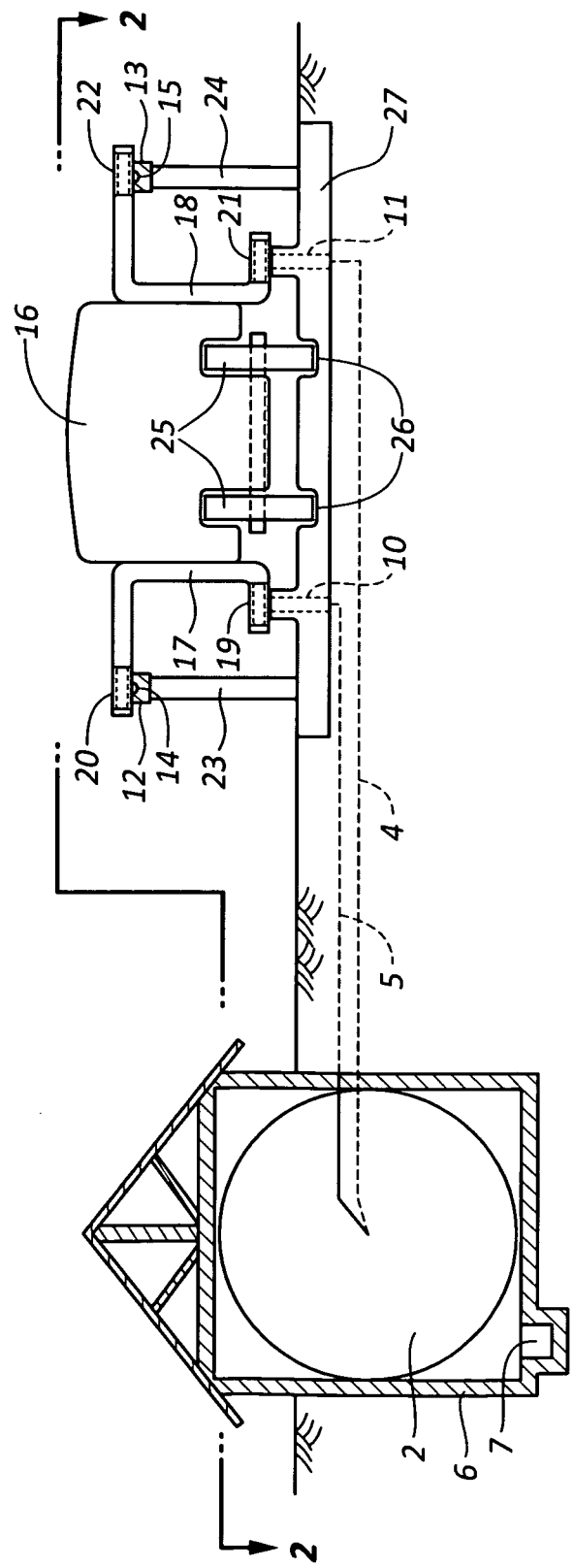
FIG. 2 is a schematic diagram showing a cross section of the view taken along section 1-1 of FIG. 1.

Towards the right side of FIG. 1 and FIG. 2, two sets of rails are shown. Rails 8 and 9 are the lower rails while rails 12 and 13 are the upper rails. Rail 12 is supported by posts 23 and rail 13 is supported by posts 24. Along lower rail 8 nails 10 are inserted at equal distances with the top of the nails flushed with the top surface of rail 8. Similarly along rail 9 nails 11 are inserted right opposite to each nail 10 of rail 8. The positive plate of a capacitor is connected to a nail 10 of rail 8 by electrical wire 5 and the negative plate of the same capacitor is connected to the corresponding nail 11 of rail 9 by electrical wire 4 as shown in FIG. 1. This way all the capacitors are wired to the nails in rails 8 and 9. Both the lower rails 8 and 9, and posts 23 and 24 are placed on slab 27. All the rails, posts, and slab 27 are constructed of materials which are non conductors of electricity.

In between lower rails 8 and 9, cart 16 moves on its wheels 25 along tracks 26. Its movement can be accomplished by mechanical or electromechanical means. This cart has two arms 17 and 18 on its two sides. The arms are configured and attached in such a way so that their lower ends touches the lower rails and the upper ends touches the upper rails. The lower end of arm 17 has a roller 19 which rolls over lower rail 8 as cart 16 moves back and forth. The lower end of arm 18 has a roller 21 which rolls over lower rail 9. The upper end of arm 17 has roller 20 which rolls along upper rail 12 and the upper end of arm 18 has roller 22 which rolls over upper rail 13. At the center of upper rail 12, cable 14 is attached which remain in contact with roller 20 as it rolls. At the center of upper rail 13, cable 15 is attached which remain in contact with roller 22 as it rolls.

Cable 14 emerges from junction box 28 and runs all the way on upper rail 12 and remains open ended at the other end. Similarly cable 15 emerges from junction box 29 and runs on upper rail 13 and it also remain open ended at the other end.

Junction box 28 has two prongs 30 and 31 and a switch 38 to connect cable 14 to either prong. Same way, junction box 29 has also two prongs 32 and 33 with switch 39 to connect cable 15 to either prong. Prong 30 is connected to positive power line 34 and prong 32 is connected to negative power line 35. Power lines 34 and 35 receive power from a power source wherefrom electricity is to be stored. If this power source is an AC power source then power lines 34 and 35 will have to receive power through an A to D converter. Prong 31 is connected to cable 36 which serves as the positive power line for motor 46 of FIG. 3. Prong 33 is connected to cable 37 which serves as the negative power line for motor 46 of FIG. 3.

Lightning arrestors 40 are installed at strategic locations in the whole facility to protect it from lightning.

Figure 3:
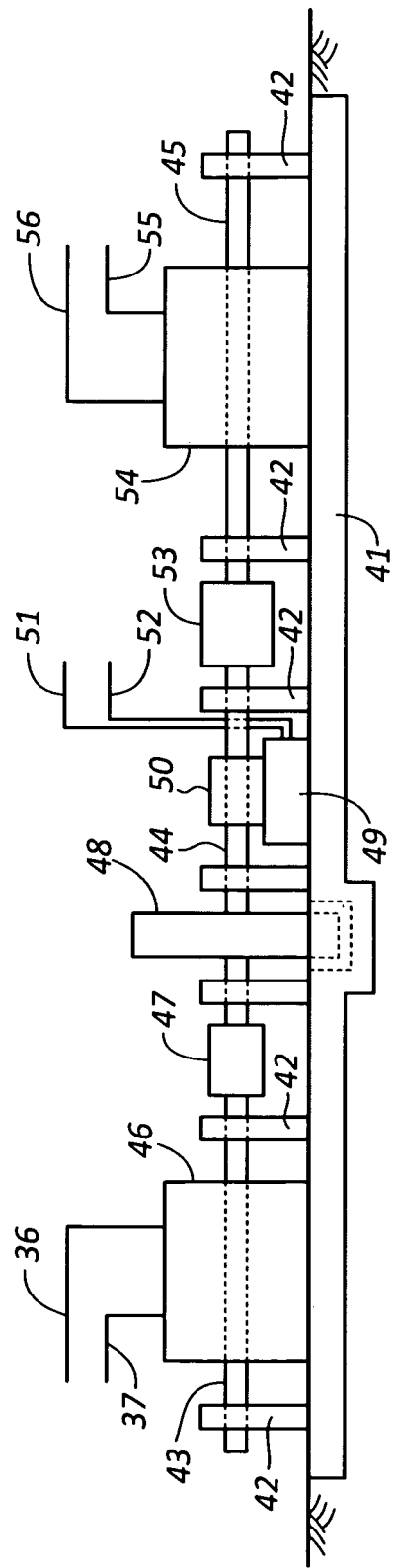
FIG. 3 is a schematic diagram showing an assembly of a motor, clutch, flywheel, starter, gear box, and a generator. These components are arranged in a way to serve the purpose of this invention.

In FIG. 3 posts 42 are mounted on slab 41. These posts support shafts 43, 44, and 45. Shaft 43 runs from the extreme left post to clutch 47. Clutch 47 is a Means Mechanical Diode type or similar one way clutch. This shaft serves to convey the torque generated by motor 46 to clutch 47. Shaft 44 runs from clutch 47 to gearbox 53, while shaft 45 extends from gearbox 53 to the end of the installation to the right. Gearbox 53 is a Continuously Variable Transmission (CVT) type or similar gear box. Flywheel 48 is mounted on shaft 44. Between flywheel 48 and gearbox 53, starter 49 along with starter gear 50 is installed. Starter 49 receives power from an established power source through power lines 51 and 52. When the motor turns shaft 43, it engages shaft 44 through clutch 47 and transfers the energy of its torque to flywheel 48. When the motor stops running in between the discharge events of any two capacitors, shaft 43 disengages itself from shaft 44 thereby allowing flywheel 48 to run continuously. This way flywheel 48 will rotate shaft 45 through gearbox 53 at desired rpm (revolutions per minute) and run generator 54. Power lines 55 and 56 come out of generator 54 to supply electricity to established power grid.

In operation the whole system works in two modes. Mode 1 is the charging mode. In this mode cables 14 and 15 are connected to prongs 30 and 32 respectively; cart 16 will be positioned at the beginning of the rails which is near junction boxes 28 and 29. At this position, rollers 19 and 21 will be in contact with the first pair of nails on the bottom rails 8 and 9. Since cables 14 and 15 are now connected to power lines 34 and 35, the system will start charging the first capacitor in the capacitor housing. After the charging is complete, cart 16 will move forward so that rollers 19 and 21 get in contact with the next pair of nails; this way all the capacitors will be charged one after another. At the end of charging, cart 16 will move forward to a safe distance and will be secured there.

When it is necessary to retrieve the stored electrical energy, the system will shift to Mode-2, which is the discharge mode. In this mode starter 49 is turned on and starter gear 50 is engaged with shaft 44. As a result the starter will slowly start turning shaft 44. As shaft 44 starts turning, it will turn flywheel 48 and shaft 45 through gearbox 53. When the rotation of flywheel 48 reaches a desired rpm, starter 49 will stop running and starter gear 50 will disengage itself from shaft 44. At this time cables 14 and 15 are connected to prongs 31 and 33 respectively. Cart 16 will then start moving backwards at a predetermined speed. When its lower rollers 19 and 21 come in contact with the last pair of nails, the last capacitor in the capacitor housing will start discharging. As a result electric current will flow to motor 46 momentarily producing a powerful torque in shaft 43 making it rotate at a high rpm. Because of its rotation shaft 43 will engage shaft 44 through the one way clutch 47, thus transferring the energy of the torque to the flywheel. Between the discharge events of any two capacitors shaft 43 will slow down and may stop rotating, but since clutch 47 is a one way clutch, it will disengage shaft 43 from shaft 44 and will allow flywheel 48 to rotate continuously. After a capacitor is discharged and flywheel 48 receives the torque through shaft 43 it will rotate at maximum rpm, however, its rotation will gradually slowdown until it receives another torque when its rotation will jump to the previous maximum. The speed of cart 16 will be adjusted in a way so that the flywheel receives the necessary torque when it reaches a minimum desired rpm level. Since gearbox 53 is a CVT type gearbox, it will ensure a desired constant rpm for shaft 45 even though the rotation of flywheel 48 may fluctuate. This way shaft 45 will run generator 54 delivering electricity through power lines 55 and 56.

The foregoing disclosure and description of the invention are illustrative and explanatory thereof and various changes in the size, shape, and materials as well as in the details of the illustrated construction may be made without departing from the spirit of the invention.

It will be understood that certain features and sub combinations are of utility and may be employed without reference to other features and sub combinations. This is contemplated by and is within the scope of the claims.

The invention having been described, what is claimed is:

1. A power storage and supply system comprising:
    a power source;
    a bank of capacitors arranged in a way so that the positive plate of one capacitor faces the positive plate of an adjacent capacitor and the negative plate of said one capacitor will face the negative plate of another adjacent capacitor so as to substantially eliminate buildup of electric flux between any two capacitors deriving electrical energy from said power source;
    a moving cart system to facilitate charging and discharging of said bank of capacitors as the moving cart system moves past said bank of capacitors, wherein the bank of capacitors is separately situated from the moving cart;
    a junction box system to work with said cart system; and
    a generator system powered by said moving cart system to produce electricity at a desired rate.

2. The power storage and supply system of claim 1, wherein the capacitor system comprises:
    a housing for the bank of capacitors;
    each capacitor comprises: two plates with a dielectric material placed in between the plates;
    one of the plates is negatively charged and one of the plates is positively charged.

3. The power storage and supply system of claim 1, wherein the cart system comprises:
    a cart;
    a first upper and second upper rail;
    a first lower and second lower rail; and
    wherein the positive plate of each capacitor is electrically connected to a nail inserted in the first lower rail and the negative plate of each capacitor is electrically connected to a corresponding nail of the second lower rail.

4. The power storage and supply system of claim 3, wherein the cart system further comprises:
    two arms attached on two sides of the cart with the lower ends touching the lower rails and the upper ends touching the upper rails;
    the lower ends of the arms comprises at least one roller which rolls over the lower rails as the cart moves back and forth;
    the upper ends of the arms comprises at least one roller which rolls along the upper rails as the cart moves back and forth; and
    a cable attached at the center of each upper rail.

5. The power storage and supply system of claim 1, wherein the junction box system comprises:
    each first upper and second upper rail is connected to a junction box wherein the cable attached at the center of the first upper and second upper rails are output from the junction boxes;
    each junction box has two prongs, first and second prongs;
    a switch in each junction box can connect it's cable to either first or second prong;
    the first prong of the first junction box is connected to a positive power line, and the first prong of the second junction box is connected to a negative power line;
    the second prong of the first junction box is connected to the positive terminal of a motor;
    and the second prong of the second junction box is connected to the negative terminal of said motor.

6. The power storage and supply system of claim 1, wherein the generator system comprises:
    a motor;
    a starter and starter gear;
    a clutch;
    a first shaft having means to engage and transfer energy;
    a second shaft mounted with a flywheel;
    a generator;
    a third shaft having means to rotate and run the said generator at a desired rpm; and
    a gear box.

7. The power storage and supply system of claim 1, wherein lightning arrestors are installed at strategic locations to protect it from lightning.

8. The power storage and supply system of claim 2, wherein the housing system for the series of capacitors is built from non-conductive materials.

9. The power storage and supply system of claim 2, wherein the housing system for the series of capacitors comprises at least one sump in the floor to collect any water that may seep into the housing;
   wherein each sump is equipped with a sump pump and a sensor.

10. The power storage and supply system of claim 3, wherein the first and second upper rails comprise:
    posts which provide support for the rails.

11. The power storage and supply system of claim 3, wherein the first and second lower rails comprise:
    nails inserted at equal distances with the top of the nails flush with the top surface of the lower rail;
    each nail in the first lower rail has a corresponding counterpart in the second lower rail; and
    said series of capacitors are connected, one at a time, to said pair of nails of the first and second lower rails.

12. The power storage and supply system of claim 3, wherein the first and second upper and lower rails, supporting posts, base slab, and the cart are all made from non-conductive materials;
    the arms of the cart along with the rollers are made from conductive materials.

13. The power storage and supply system of claim 1, wherein storing electrical power comprises:
    connecting a bank of capacitors to a cart system;
    charging the said capacitors individually one at a time by withdrawing electrical power from a power source utilizing the cart system and the junction box system.

14. The power storage and supply system of claim 1, wherein discharging each capacitor comprises:
    discharging each capacitor one at a time at predetermined time intervals utilizing the cart system and the junction box system.

15. The power storage and supply system of claim 6, wherein producing electricity at a predetermined steady rate utilizing the electrical power retrieved by discharging the capacitors comprises:
    electrical energy retrieved by discharging the capacitors is delivered to a motor to rotate a first shaft of the motor of the generator system having means to engage and transfer the energy of its torque to a second shaft which is mounted with a flywheel;
    the first shaft having means to disengage itself from said second shaft when the first shaft slows down in between the discharge events of any two capacitors;
    the second shaft has means to rotate a third shaft at a desired rpm;
    said third shaft is connected to a generator producing electricity at a desired rate.

16. The power storage and supply system of claim 15, wherein the second shaft has means to overcome the inertia of rest of the flywheel by utilizing power from established power source and start rotating itself along with the flywheel before the start of the process of discharging the capacitors;
    the second shaft has means to disconnect itself from said power source once the flywheel attains a desired rpm.

17. The power storage and supply system of claim 15, wherein the method further comprises:
    the second shaft and the flywheel start rotating by means of a starter and a starter gear before starting the process of discharging the capacitors;
    said starter draws power from established power grid;
    when the rotation of the second shaft and the flywheel reach a desired rpm, the starter gear disengages itself from the second shaft and the starter stops running;
    each capacitor is then discharged one at a time at a predetermined time interval;
    the electrical energy retrieved by discharging each capacitor is used to activate the motor;
    as the motor is activated, the first shaft rotates;
    the first shaft engages itself to the second shaft using a one way clutch and transfers the energy of its torque to the flywheel;
    as the rotation of the first shaft slows down, it disengages itself from the second shaft;
    the inertia of motion of the flywheel enables the second shaft to rotate the third shaft at a desired rpm using a Continuously Variable Transmission (CVT) type or similar gear box; and
    the third shaft runs a generator to produce electricity at a desired rate.

18. The power storage and supply system of claim 6 wherein storing electrical energy in said bank of capacitors that recycles said electrical energy by retrieving the said electrical energy when needed and utilizing this energy to rotate a shaft and to run a generator to produce electricity.

* * * * *